(12) United States Patent
Masuda et al.

(10) Patent No.: US 10,703,114 B2
(45) Date of Patent: Jul. 7, 2020

(54) PRINTING DEVICE AND PRINTING METHOD

(71) Applicants: Kiminori Masuda, Tokyo (JP);
Hiroaki Takahashi, Kanagawa (JP);
Mio Akima, Tokyo (JP)

(72) Inventors: Kiminori Masuda, Tokyo (JP);
Hiroaki Takahashi, Kanagawa (JP);
Mio Akima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/426,481

(22) Filed: May 30, 2019

(65) Prior Publication Data
US 2019/0381811 A1    Dec. 19, 2019

(30) Foreign Application Priority Data

Jun. 15, 2018  (JP) .................................. 2018-114309
Mar. 14, 2019  (JP) .................................. 2019-046685

(51) Int. Cl.
*B41J 11/00* (2006.01)
*C09D 11/101* (2014.01)
*C09D 11/023* (2014.01)

(52) U.S. Cl.
CPC .......... *B41J 11/002* (2013.01); *C09D 11/101* (2013.01); *C09D 11/023* (2013.01)

(58) Field of Classification Search
CPC ... B41J 11/002; C09D 11/101; B41M 5/0011; B41M 7/009
See application file for complete search history.

(56) References Cited

U.S. PATENT DOCUMENTS

| 9,114,638 | B2 * | 8/2015 | Ogasawara | ............ B41J 11/002 |
| 9,499,703 | B2 * | 11/2016 | Kaga | .................... B41M 5/0023 |
| 9,523,010 | B2 * | 12/2016 | Haijima | ................. C09D 11/30 |
| 10,011,665 | B1 * | 7/2018 | Miyano | ..................... C08F 2/48 |
| 10,532,587 | B2 * | 1/2020 | Ohnishi | ................ B41M 7/009 |

FOREIGN PATENT DOCUMENTS

| JP | 2004-261976 | 9/2004 |
| JP | 2012-232529 | 11/2012 |
| JP | 2015-003397 | 1/2015 |

* cited by examiner

*Primary Examiner* — Henok D Legesse
(74) *Attorney, Agent, or Firm* — Oblon, McClelland, Maier & Neustadt, L.L.P.

(57) ABSTRACT

A printing device includes an ink container accommodating a liquid containing a clear ink containing water and a resin, a discharging head to discharge the clear ink directly or indirectly onto a substrate to form a printing layer, and a heating device to heat the substrate, wherein the following relationship is satisfied: Tlow (degrees C.)>Thigh (degrees C.), where Tlow (degrees C.) represents the temperature of the substrate that the heating device is heating during printing in a low gloss printing mode and Thigh (degrees C.) represents the temperature of the substrate that the heating device is heating during printing in a high gloss printing mode, wherein the following relationships are satisfied: in the high gloss printing mode, Gp≥Gm and, in the low gloss printing mode, Gm≥Gp, where Gm represents the gloss level of the substrate and Gp represents the gloss level of the printing layer.

17 Claims, 2 Drawing Sheets

PRINTING DEVICE AND PRINTING METHOD

CROSS-REFERENCE TO RELATED APPLICATIONS

This patent application is based on and claims priority pursuant to 35 U.S.C. § 119 to Japanese Patent Application Nos. 2018-114309 and 2019-046685, filed on Jun. 15, 2018 and Mar. 14, 2019, respectively, in the Japan Patent Office, the entire disclosures of which are hereby incorporated by reference herein.

BACKGROUND

Technical Field

The present invention relates to a printing device and a printing method.

Description of the Related Art

For industrial use in advertisement and signboards and packaging material for food, beverage, and daily use articles, etc., for example, non-permeable recording media such as plastic film are used in order to enhance durability for light, water, abrasion, etc. Naturally, inks for such non-permeable recording media have been developed.

As such inks, for example, a solvent-based ink using an organic solvent as a solvent and an ultraviolet-curable ink mainly constituted of a polymerizable monomer have been widely used. However, the solvent-based ink causes a concern about an adverse impact on the environment due to evaporation of the organic solvent. The ultraviolet curing ink has a limited choice of polymerizable monomers in terms of safety in some cases.

For this reason, an ink set including an aqueous ink capable of directly recording on a non-permeable recording medium has been proposed.

SUMMARY

According to embodiments of the present disclosure, provided is a printing device which includes an ink container accommodating a clear ink comprising water and a resin, a discharging head configured to discharge the clear ink directly or indirectly onto a substrate to form a printing layer and a heating device configured to heat the substrate, wherein the following relationship is satisfied: Tlow (degrees C.)>Thigh (degrees C.), where Tlow (degrees C.) represents the temperature of the substrate that the heating device is heating during printing in a low gloss printing mode in which the clear ink is directly or indirectly discharged and attached to the substrate to impart low gloss to the printing layer and Thigh (degrees C.) represents the temperature of the substrate that the heating device is heating during printing in a high gloss printing mode in which the clear ink is directly or indirectly discharged and attached to the substrate to impart high gloss to the printing layer, wherein the following relationships are satisfied: in the high gloss printing mode, Gp≥Gm, and, in the low gloss printing mode, Gm≥Gp, where Gm represents the gloss level of the substrate and Gp represents the gloss level of the printing layer.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
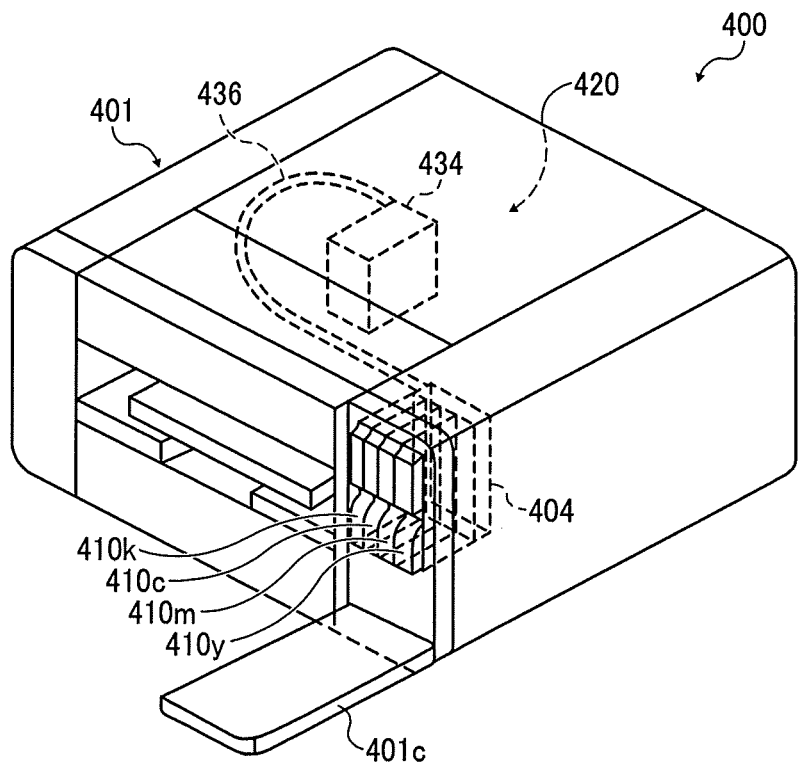
FIG. 1 is a schematic diagram illustrating an example of the image forming device executing the image forming method according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Inkjet recording devices having a feature capable of controlling gloss have been developed.

For example, a liquid jetting device has been proposed which includes a liquid jetting head capable of jetting an ink containing thermoplastic resin particles from a nozzle to a target and a heating device to heat ink droplets landed on the target, wherein the heating device heats the ink droplets at the filming control temperature according to the minimal film-forming temperature below which the surface of the ink droplets is not filmed to control the degree of the filming of the surface of the ink droplets.

According to the present disclosure, a printing device is provided which is capable of controlling both low gloss printing and high gloss printing.

Printing Device and Printing Method

The printing device according to an embodiment of the present disclosure includes an ink container accommodating a liquid containing a clear ink containing water and a resin, a discharging head configured to discharge the clear ink directly or indirectly onto a substrate to form a printing layer, and a heating device configured to heat the substrate, wherein the following relationship is satisfied:

Tlow (degrees C.)>Thigh (degrees C.), where Tlow (degrees C.) represents the temperature of the substrate that the heating device is heating during printing in a low gloss printing mode in which the clear ink is directly or indirectly discharged and attached to the substrate to impart low gloss to the printing layer and Thigh (degrees C.) represents a temperature of the substrate that the heating device is heating during printing in a high gloss printing mode in which the clear ink is directly or indirectly discharged and attached to the substrate to impart high gloss to the printing layer, wherein the following relationships are satisfied:

in the high gloss printing mode, Gp≥Gm, and, in the low gloss printing mode, Gm≥Gp, where Gm represents a gloss level of the substrate and Gp represents a gloss level of the printing layer.

The printing device according to an embodiment of the present disclosure includes an ink container accommodating a liquid containing a clear ink containing water and a resin, a discharging head configured to discharge the clear ink directly or indirectly onto a substrate to form a printing layer, and a heating device configured to heat the substrate, wherein the following relationship is satisfied:

HTlow (degrees C.)>HThigh (degrees C.), where HTlow (degrees C.) represents the temperature of the heating device during printing in a low gloss printing mode in which the clear ink is directly or indirectly discharged and attached to the substrate to impart low gloss to the printing layer and HThigh (degrees C.) represents the temperature of the heating device in a high gloss during printing in a high gloss printing mode in which the clear ink is directly or indirectly discharged and attached to the substrate to impart high gloss to the printing layer, wherein the following relationships are satisfied:

in the high gloss printing mode, Gp≥Gm, and, in the low gloss printing mode, Gm≥Gp, where Gm represents a gloss level of the substrate and Gp represents a gloss level of the printing layer.

A printing method according to an embodiment of the present disclosure includes discharging a liquid containing a clear ink containing water and a resin directly or indirectly onto a substrate to form a printing layer and heating the substrate by a heating device, wherein the following relationship is satisfied:

Tlow (degrees C.)>Thigh (degrees C.), where Tlow (degrees C.) represents the temperature of the substrate that the heating device is heating during printing in a low gloss printing mode in which the clear ink is directly or indirectly discharged and attached to the substrate to impart low gloss to the printing layer and Thigh (degrees C.) represents the temperature of the substrate that the heating device is heating during printing in a high gloss printing mode in which the clear ink is directly or indirectly discharged and attached to the substrate to impart high gloss to the printing layer, wherein the following relationships are satisfied:

in the high gloss printing mode, Gp≥Gm, and, in the low gloss printing mode, Gm≥Gp, where Gm represents a gloss level of the substrate and Gp represents a gloss level of the printing layer. The printing method includes other optional processes.

The printing method according to an embodiment of the present disclosure includes discharging a clear ink containing water and a resin directly or indirectly onto a substrate to form a printing layer and heating the substrate by a heating device, wherein the following relationship is satisfied:

HTlow (degrees C.)>HThigh (degrees C.), where HTlow (degrees C.) represents a temperature of the substrate that the heating device is heating during printing in a low gloss printing mode in which the clear ink is directly or indirectly discharged and attached to the substrate to impart low gloss to the printing layer and HThigh (degrees C.) represents a temperature of the heating device during printing in a high gloss printing mode in which the clear ink is directly or indirectly discharged and attached to the substrate to impart high gloss to the printing layer, wherein the following relationship is satisfied: in the high gloss printing mode, Gp≥Gm and, in the low gloss printing mode, Gm≥Gp, where Gm represents a gloss level of the substrate and Gp represents a gloss level of the printing layer. The printing method includes other optional processes.

For a typical printing device using a clear ink (UV clear ink) that cures upon an application of ultraviolet rays, a gloss control method has been proposed which controls the irradiation amount of ultraviolet rays to select matte or gloss printing.

However, UV clear ink has a problem of having a strong odor. Since the odor remains in the printed matter, it is unsuitable for the printed matter for indoor use. For this reason, the place of installation of the printing device also requires an environment capable of exhausting air, which limits the selection of the place of installation. In addition, the UV clear ink requires an ultraviolet ray irradiation device, which increases the size of the device and the cost.

The printing device and the printing method of the present disclosure are based on the knowledge that although, in a typical technology disclosed in JP-2015-3397-A, the degree of filming of the surface of droplets of color ink containing a coloring material is controlled by heating at film-forming control temperatures according to the minimal film-forming temperature at which film formation of the ink droplet starts in order to control the degree of gloss, the color ink containing a coloring material does not make a large gloss difference in comparison with a clear ink containing no coloring material, which makes it impossible to clearly distinguish matte printing from gloss printing.

The printing device and the printing method of the present disclosure use a clear ink containing water and a resin, and control both high gloss printing and low gloss printing by the control of the heating temperature. To impart low gloss to printed matter (i.e., printing layer), the temperature at printing is higher than that in high gloss printing. Since the temperature at the time of printing is high, the wet-spreading of dots of a clear ink containing a resin is reduced, the coalescence of adjacent dots is also reduced, and dots having dot balls having a high height (pile height) are formed. These dots form surface irregularities and impart low gloss.

To impart high gloss, printing is conducted at a temperature lower than that in the low gloss printing. Since the temperature at the time of printing is low, dots of a clear ink containing a resin wet-spread and coalescence of adjacent dots is also promoted, so that smooth surfaces are formed, thereby imparting high gloss.

Therefore, the printing device according to an embodiment of the present disclosure has low gloss printing mode to impart low gloss and high gloss printing mode to impart high gloss using a liquid containing a clear ink containing water and a resin and is capable of controlling both low gloss printing and high gloss printing when the following relationship is satisfied: Tlow (degrees C.)>Thigh (degrees C.), where Tlow (degrees C.) represents the temperature of the substrate that the heating device is heating during printing in a low gloss printing mode in which the liquid is directly or indirectly discharged and attached to the substrate and Thigh (degrees C.) represents the temperature of the substrate that the heating device is heating during printing in a high gloss printing mode in which the liquid is directly or indirectly discharged and attached to the substrate or when the following relationship is satisfied: HTlow (degrees C.)>HThigh (degrees C.), where HTlow (degrees C.) represents the temperature of the heating device during printing in a low gloss printing mode in which the liquid is directly or indirectly discharged and attached to the substrate and HThigh (degrees C.) represents the temperature of the heating device in a high gloss during printing in a high gloss printing mode in which the liquid is directly or indirectly discharged and attached to the substrate.

The heating device of the printing device according to an embodiment of the present disclosure heats the substrate while satisfying the following relationship: Tlow (degrees C.)>Thigh (degrees C.), preferably Tlow (degrees C.)–Thigh (degrees C.)≥10 degrees C., and more preferably Tlow (degrees C.)–Thigh (degrees C.)≥20 degrees C. Also, when the temperature of the heating device in the low gloss printing mode is HTlow (degrees C.) and the temperature of the heating device in the high gloss printing mode is HThigh (degrees C.), the following relationship is satisfied: HTlow (degrees C.)>HThigh (degrees C.), preferably HTlow (degrees C.)–HThigh (degrees C.)≥10 degrees C., and more preferably HTlow (degrees C.)–HThigh (degrees C.)≥20 degrees C.

Therefore, in the low gloss printing mode, the heating temperature is raised to reduce wet-spreading of dots, thereby forming dots having a high pile height to form a surface having large roughness. In the gloss printing mode, the heating temperature is lowered to promote the wet-spreading of dots, which promotes coalescence of adjacent dots, resulting in formation of a smooth surface.

There is no specific limitation to the temperature HT (degrees C.) of the heating device and can be suitably selected to suit to a particular application. For example, the preset temperature of the heating device can be used as the temperature HT (degrees C.) of the heating device.

The temperature Tlow (degrees C.) of the substrate in a printing area in the low gloss printing mode is preferably 50 degrees C. or more and more preferably from 50 to 80 degrees C.

The temperature Thigh (degrees C.) of the substrate in a printing area in the high gloss printing mode is preferably 70 degrees C. or less and more preferably 60 degrees C. or less.

The temperature HTlow (degrees C.) of the heating device in the low gloss printing mode is preferably 50 degrees C. or more and more preferably from 50 to 80 degrees C.

The temperature HThigh (degrees C.) of the heating device in the high gloss printing mode is preferably 70 degrees C. or less and more preferably from 60 degrees C. or less. Within this temperature range, a large change in glossiness can be demonstrated in each printing mode using the aqueous clear ink.

The temperature of the substrate of the printing portion is measured by, for example, a method of directly measuring the recording medium by a thermocouple mounted onto the recording medium as the substrate, a method of measuring the temperature of the heater that heats the recording medium, and a method of measuring the ambient temperature of the recording medium in a non-contact manner by a radiation thermometer, etc., to determine the ambient temperature as the temperature of the recording medium.

In the present disclosure, assuming that the gloss level of the substrate is Gm and the gloss level of the surface of the printing layer after printing is Gp, in the case of the high gloss printing mode, the following relationship is satisfied: in the high gloss printing mode, Gp≥Gm, preferably, GP−Gm≥20, and more preferably, Gp−Gm≥49, and, in the low gloss printing mode, the following relationship is satisfied: Gm≥Gp, preferably, Gm−Gp≥30, and more preferably, Gm−Gp≥57.

When the difference in the gloss level is within the above-mentioned numerical range, the difference between the high gloss portion, the low gloss printing portion, and the portion around them becomes clearly recognizable.

Root Mean Square Gradient Sdq

Sdq (root mean square gradient) is defined in ISO 25178 regulation as one of the parameters representing the surface roughness of a certain defined area. A large value of Sdq means that there are many gradient portions or a large gradient surface in the definition area. This leads to the scattering of light on the gradient surface, resulting in a decrease in the gloss level. For this reason, to impart high gloss, Sdq may be increased. Conversely, to impart low gloss, Sdq may be decreased.

From this point of view, in the present disclosure, when assuming Sdq of the substrate is Sdqm, and Sdq of the print layer surface after printing is Sdqp, it is preferable that the following relationship is satisfied: in the high gloss printing mode, preferably Sdqm≥Sdqp and more preferably Sdqm−Sdqp≥0.03, and, in the low gloss printing mode, preferably Sdqp≥Sdqm, and more preferably Sdqp−Sdqm≥0.05. When the difference in the gloss level is within this range, the difference between the high gloss portion, the low gloss printing portion, and the portion around them becomes clearly recognizable.

The root mean square gradient Sdq can be determined, for example, by measuring ISO 25178 surface texture (ISO 25178 parameter) using a scanning white microscope (VS1530 manufactured by Hitachi High-Technologies Corporation).

In the present disclosure, when the printing ratio of a low gloss print image printed in the low gloss printing mode is Dlow and the printing ratio of a high gloss print image printed in the high gloss printing mode is Dhigh, the following relationship is preferably satisfied: Dhigh>Dlow and more preferably Dhigh−Dlow>10 percent.

Since a smooth surface is easily formed when the printing ratio is high, an image having a high printing ratio is obtained in the gloss printing mode. In the matte gloss printing mode, when the printing ratio is high, adjacent dots are coalesced, thereby making it difficult to obtain surface roughness. Therefore, the printing ratio is low in the matter printing mode.

The printing ratio means the following:

Print ratio (percent)=number of clear ink print dots/(vertical resolution horizontal resolution)×100

In the above formula, "the number of clear ink printing dots" means the number of dots actually printed with clear ink per unit area, and "vertical resolution" and "horizontal resolution" are represented in resolutions per unit area. When clear ink is disposed at the same dot position in an overlapping manner for printing, "the number of clear ink printing dots" represents the total number of dots per unit area actually used for printing with clear ink.

The printing ratio 100 percent means the maximum ink weight of a single color with respect to a pixel.

The present disclosure includes a configuration in which the clear ink is directly applied onto the substrate. It also includes a configuration in which a coating layer is applied onto the substrate and the clear ink is thereafter applied to the substrate or the coating layer, and a configuration in which a processing fluid is and/or a color ink containing a coloring material is applied onto the substrate and thereafter the clear ink is applied onto the substrate, the processing layer, or the color ink layer, meaning that the clear ink is indirectly applied onto the substrate.

Ink Container

The ink container accommodates ink.

The ink container is not particularly limited as long as it is a member capable of accommodating ink. For example, it includes an ink storage container and an ink tank.

The ink container accommodates the ink and includes other optional suitably-selected members.

There is no specific limit to the ink container. It is possible to select any form, any structure, any size, and any material. For example, a container having at least an ink bag formed of aluminum laminate film, a resin film, etc., can be suitably used.

Examples of the ink tank include a main tank and a sub tank.

Discharging Head

The discharging head discharges ink to form a printing layer on the substrate mentioned above where the ink is attached.

The discharging head includes a nozzle plate, pressurizing chambers, and a stimulus generating device.

Nozzle Plate

The nozzle plate includes a nozzle substrate and an ink repellent film on the nozzle substrate.

Pressure Chamber

Each of the pressurizing chambers, which is individually disposed corresponding to a nozzle orifice provided to the nozzle plate is an individual flow path communicating with the nozzle orifice. The pressurizing chamber is also referred to as an ink flow path, a pressurizing liquid chamber, a pressure chamber, a discharging chamber, a liquid chamber, etc.

Stimulus Generating Device

The stimulus generating device generates a stimulus to be applied to the ink.

The stimulus generated by the stimulus generating device has no specific limit and can be suitably selected to a particular application. For example, heat (temperature), pressure, vibration, and light can be suitably used as the stimulus. These can be used alone or in combination. Of these, heat and pressure are preferable.

The stimulus generating device includes, for example, a heater, a pressurizing device, a piezoelectric element, a vibrator, an ultrasonic oscillator, and light.

Specific examples include, but are not limited to, a piezoelectric actuator such as the piezoelectric element, a thermal actuator that utilizes a phase change caused by film boiling of ink using an electric heat conversion element such as a heat generating resistance, a shape-memory alloy actuator that uses the metal phase change due to temperature change, and an electrostatic actuator that utilizes an electrostatic force.

When the stimulus is "heat", thermal energy corresponding to a recording signal is applied to the ink in the ink discharging head using, for example, a thermal head. For example, a method can be utilized which generates bubbles in the ink by the heat energy and discharges the ink as liquid droplets from the nozzle orifice of the nozzle plate by the pressure of the bubbles.

When the stimulus is "pressure", for example, the piezoelectric element is bent by applying a voltage to the piezoelectric element bonded at a position called the pressure chamber in the ink flow path in the ink discharging head. As a result, the volume of the pressure chamber is contracted, and the ink may be discharged as droplets from the nozzle orifice of the ink discharging head.

Of these, a piezo method discharging an ink by applying a voltage to a piezoelectric element to jet the ink is preferable.

Heating Device

The heating device heats the substrate.

The heating device heats and dries the printing surface and the back surface of the recording medium as the substrate. Examples of the heating device includes an infrared heater, a hot air heater, and a heating roller. These can be used alone or in combination.

The method of drying the recording medium as the substrate is not particularly limited and can be suitably selected to suit to a particular application. Examples of the method include, but are not limited to, a method of drying the recording medium to which the ink is applied by bringing a heated fluid such as warm air as a drying device into contact with the recording medium, a method of transferring heat from a heating member to an ink applied recording medium by contact, and a method of heating the recording medium to which the ink is applied with energy rays such as infrared rays or far infrared rays.

The heating can be conducted before, during, and/or after printing.

Heating before and/or in the middle of printing makes it possible to print on a heated medium and the printed matter can be dried by heating after printing.

The heating time is not particularly limited as long as the surface temperature of the recording medium can be controlled to a desired temperature and can be suitably selected to suit to a particular application.

The heating time is preferably controlled by the control of the conveying speed of the recording medium as the substrate.

Liquid

The liquid containing an aqueous clear ink is used.

The clear ink means a colorless and transparent ink substantially free of a coloring material.

The aqueous clear ink means a clear ink containing water as a solvent, and may contain an organic solvent as required.

The aqueous clear ink contains water, a resin, preferably a surfactant, and other optional components.

Water

There is no specific limitation to the water and it can be suitably selected to suit to a particular application. For example, pure water such as deionized water, ultrafiltered water, reverse osmosis water, and distilled water and ultra pure water are suitable. These can be used alone or in combination.

The proportion of the water is preferably from 15 to 60 percent by mass to the total amount of the aqueous clear ink. When the proportion is 15 percent by mass or more, high viscosity can be prevented, and discharge stability can be improved. On the other hand, when the proportion is 60 percent by mass or less, the wettability to a non-permeable recording medium becomes suitable, and the image quality can be improved.

Resin

The resin has no particular limit and can be suitably selected to suit to a particular application. Specific examples include, but are not limited to, polyurethane resins, polyester resins, acrylic resins, vinyl acetate resins, styrene resins, butadiene resins, styrene-butadiene resins, vinylchloride resins, acrylic styrene resins, and acrylic silicone resins.

When manufacturing the ink, it is preferable to add the resin as resin particles composed of these resins. The resin particle may be added to the ink in a form of a resin emulsion in which the resin is dispersed in water as a dispersion medium. It is possible to use suitably-synthesized resin particulate as the resin particle. Alternatively, the resin particulate available on the market can be used. These resin particles can be used alone or in combination. Of these, polyurethane resins are preferable. By adding a polyurethane resin, when an ink film is formed using a clear ink, the coating film itself becomes robust. As a consequence, it is easy to reduce breakage of the film inside, which leads to a color change in the abraded portion and the change in the surface state of the film, resulting in color change in the abraded portion.

Polyurethane Resin

Examples of the polyurethane resin include, but are not limited to, polyether-based polyurethane resin, polycarbonate-based polyurethane resin, and polyester-based polyurethane resin are preferable.

There is no specific limit to the polyurethane resin and it can be suitably selected to suit to a particular application. For example, polyurethane resin, etc., are suitably used, which are obtained by causing polyol to react with polyisocyanate.

Polyol

Examples of the polyol include, but are not limited to, polyether polyols, polycarbonate polyols, and polyester polyols. These can be used alone or in combination.

Polyether Polyol

As the polyether polyol, for example, usable is an article obtained by addition polymerization of an alkyleneoxide to a starting material, which is at least one kind of compounds having two or more active hydrogen atoms.

Specific examples of the compound including two or more active hydrogen atoms include, but are not limited to, ethylene glycol, diethylene glycol, triethylene glycol, propylene glycol, trimethylene glycol, 1,3-butanediol, 1,4-butanediol, 1,6-hexanediol, glycerin, trimethylol ethane, and trimethylol propane. These can be used alone or in combination.

In addition, specific examples of the alkylene oxide include, but are not limited to, ethylene oxide, propylene oxide, butylene oxide, styrene oxide, epichlorohydrine, and tetrahydrofuran. These can be used alone or in combination.

The polyether polyol has not a particular limit and can be suitably selected to suit to a particular application. It is preferable to use polyoxytetra methylene glycol or polyoxypropylene glycol in order to obtain a binder for ink having extremely excellent scratch resistance. These can be used alone or in combination.

Polycarbonate Polyol

As polycarbonate polyol that can be used to manufacture the polyurethane resin, for example, a product obtained by causing a carboxylic acid ester to react with a polyol or causing a phosgene to react with bisphenol A, etc. These can be used alone or in combination.

Specific examples of carboxylic acid esters include, but are not limited to, methyl carbonate, dimethyl carbonate, ethyl carbonate, diethyl carbonate, cyclocarbonate, and diphenyl carbonate. These can be used alone or in combination.

Specific examples of the polyol include, but are not limited to, dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentane diol, 1,5-hexanediol, 2,5-hexanediol, 1,6-hexanediol, 1,7-heptane diol, 1,8-octane diol, 1,9-nonane diol, 1,10-decane diol, 1,11-undecane diol, 1,12-dodecane diol, 1,4-cyclohexanediol, 1,4-cyclohexane dimethanol, hydroquinone, resorcin, bisphenol A, bisphenol F, and 4,4'-biphenol, and polyether polyols such as polyethylene glycol, polypropylene glycol, and polyoxytetramethylene glycol, and polyester polyols such as polyhexanmethylene adipate, polyhexamethylene succinate, and polycaprolactone. These can be used alone or in combination.

Polyester Polyol

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a copolymerized polyester thereof. These can be used alone or in combination.

Specific examples of the polyol having a low molecular weight include, but are not limited to, ethylene glycol and propylene glycol. These can be used alone or in combination.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof. These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethyl hexamethylene diisocyanate. These can be used alone or in combination. Of these, alicyclic diisocyanate is preferably used in terms of weatherability.

Furthermore, it is preferable to add at least one kind of alicyclic diisocyanate, thereby easily acquiring a desired film robustness and scratch resistance.

Specific examples of the alicyclic diisocyanate include, but are not limited to, isophorone diisocyanate and dicyclohexylmethane diisocyanate.

The content ratio of the alicyclic diisocyanate is preferably 60 percent by mass or greater to the total content of the isocyanate compound.

Method of Manufacturing Polyurethane Resin

The polyurethane resin has no particular limit and can be manufactured by typical manufacturing methods. For example, the following method is suitable.

First, a urethane prepolymer having an isocyanate group at its distal end is prepared under the presence of no solvent or an organic solvent through the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if necessary to obtain the urethane resin particle.

Specific examples of the organic solvent for use in manufacturing the polyurethane resin include, but are not limited to, ketones such as acetone and methylethyl ketone; ethers such as tetrahydrofuran and dioxane, acetic acid esters such as ethyl acetate and butyl acetate, nitriles such as acetonitrile, and amides such as dimethyl formamide, N-methyl pyrolidone, and N-ethyl pyrolidone. These can be used alone or in combination.

Polyamines or other compounds having an active hydrogen group are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isphorone diamine, 4,4'-dicyclohexyl methane diamine, and 1,4-cyclohexane diamine, polyamines such as diethylene triamine, dipropylene triamine, and triethylene tetramine, hydrazines such as hydradine, N,N'-dimethyl hydrazine, and 1,6-hexamethylene bis hydrazine, and dihydrazides such as succinic acid dihydrazide, adipic acid dihydrazide, glutaric acid dihydrazide, sebacic acid dihydrazide, and isophthalic acid dihydrazide. These can be used alone or in combination.

Specific examples of the compounds having active hydrogen groups include, but are not limited to, glycols such as ethylene glycol, diethylene glycol, triethylene glycol, propylene glycol, 1,3-propane diol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination unless degrading the storage stability of ink.

As the polyurethane resin, polycarbonate-based polyurethane resins are preferable in terms of water resistance, heat resistance, abrasion resistance, weathering resistance, and scratch resistance of images due to high agglomeration power of carbonate groups. Ink obtained by using polycarbonate-based polyurethane resin is suitable for recorded matter for use in severe conditions like outdoor use.

As the polyurethane resin, products available on the market can be used.

Specific examples include, but are not limited to, UCOAT UX-485 (polycarbonate-based polyurethane resin), UCOAT UWS-145 (polyester-based polyurethane resin), PERMARIN UA-368T (polycarbonate-based polyurethane resin), and PERMARIN UA-200 (polyether-based polyurethane resin) (all manufactured by Sanyo Chemical Industries, Ltd.). These can be used alone or in combination.

The proportion of the resin in the clear ink is preferably from 8 percent by mass or more and more preferably from 8 to 25 percent by mass. When the resin proportion is 8 percent by mass or more, low gloss and high gloss can be controlled with a small amount of clear ink. When the proportion of the resin exceeds 25 percent by mass, the discharging Matte is demonstrated by forming isolated dots having high dot ball height (pile height) to impart roughness to the surface.

When the proportion of the resin in the clear ink is large, dots having a high pile height are easily formed, which is preferable in terms of imparting matte.

Conversely, high gloss is obtained by filling surface irregularities with clear ink, thereby forming a smooth surface. In order to fill the surface irregularities with the clear ink, it is preferable that the proportion of the resin in the clear ink be large because the surface irregularities can be filled with a small amount of clear ink, thereby easily imparting gloss.

Surfactant

The clear ink preferably contains a surfactant.

When a surfactant is added to the ink, the surface tension is lowered and the ink droplets quickly permeate a recording medium after the ink droplets have landed thereon, so that feathering and color bleed are reduced.

Surfactants are classified into nonionicity, anionicity, and amphotericity according to the polarity of the hydrophilic group.

Moreover, it is classified into a fluorine type, a silicone type, an acetylene type, etc., according to the structure of a hydrophobic group.

In the present disclosure, a fluorine-based surfactant is mainly used, but a silicone-based surfactant or an acetylene-based surfactant may be used in combination.

The proportion of the surfactant is preferably not greater than 2.00 percent by mass, more preferably from 0.05 to 2.00 percent by mass, and furthermore preferably from 0.10 to 2.00 percent by mass. When the proportion of the surfactant is 2.00 percent by mass or less, a large reduction in gloss can be obtained in the low gloss printing mode.

As the surfactant, it is possible to use any of silicone-based surfactants, fluorochemical surfactants, amphoteric surfactants, nonionic surfactants, or anionic surfactants.

The silicone-based surfactant has no particular limit and can be suitably selected to suit to a particular application. Of these, preferred are silicone-based surfactants which are not decomposed even in a high pH environment. Examples are side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluoro-surfactants are, for example, Li, Ha, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

$$H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_m\left[\underset{\underset{X}{|}}{\overset{\overset{CH_3}{|}}{Si}}-O\right]_n\underset{\underset{CH_3}{|}}{\overset{\overset{CH_3}{|}}{Si}}-CH_3$$

$X = —R(C_2H_4O)_a\ (C_3H_6O)_b\ R'$

In Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

$CF_3CF_2(CF_2CF_2)_m—CH_2CH_2O(CH_2CH_2O)_nH$    Chemical formula F-1

In the compound represented by Chemical formula F-1, m is preferably 0 or an integer of from 1 to 10 and n is preferably 0 or an integer of from 1 to 40.

$CnF_{2n+1}—CH_2CH(OH)CH_2—O—(CH_2CH_2O)_a—Y$    Chemical formula F-2

In the compound represented by the chemical formula F-2, Y represents H or $CmF2m+1$, where m represents an integer of from 1 to 6, or $CH_2CH(OH)CH_2—CmF_{2m+1}$, where m represents an integer of from 4 to 6, or $C_pH_{2p+1}$, where p is an integer of from 1 to 19, "n" represents an integer of from 1 to 6. "a" represents an integer of from 4 to 14.

As the fluorochemical surfactant, products available on the market may be used. Specific examples include, but are not limited to, SURFLON S-111, S-112, 5-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

Organic Solvent

The clear ink may contain an organic solvent. The organic solvent has no specific limit and is suitably selected to suit to a particular application. For example, water-soluble organic solvents are usable. Note that being water-soluble means, for example, 5 g or more of an organic solvent is dissolved in 100 g of water at 25 degrees C.

Specific examples of the water-soluble organic solvent include, but are not limited to, polyols such as ethylene glycol, diethylene glycol, 1,2-propane diol, 1,3-propane diol, 1,2-butanediol, 1,3-butanediol, 2,3-butanediol, 3-methyl-1,3-butanediol, 3-methoxy-3-methyl butanol, triethylene glycol, polyethylene glycol, polypropylene glycol, 1,5-pentane diol, 2-methyl-2,4-pentane diol, 1,6-hexanediol, glycerin, 1,2,6-hexane triol, 2-ethyl-1,3-hexanediol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and dipropylene glycol monomethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamide, N-methylformamide, and N,N-dimethylformamide; amines such as monoethanol amine, diethanolamine, and triethanolamine; sulfur-containing compounds such as dimethyl sulfoxide, sulfolane, and thiodiethanol; propylene carbonate, and ethylene carbonate. These can be used alone or in combination.

The proportion of the organic solvent in the aqueous clear ink has no particular limit and can be suitably selected to suit to a particular application.

In terms of drying property and discharging reliability of ink, the proportion is preferably from 10 to 60 percent by mass and more preferably from 20 to 60 percent by mass.

The aqueous clear ink may furthermore optionally contain, for example, a defoaming agent, a preservatives and fungicides, a corrosion inhibitor, and a pH regulator.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of the aqueous clear ink are not particularly limited and can be suitably selected to suit to a particular application. For example, viscosity, surface tension, pH, etc., are preferable if those are in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Rotational frequency: 50 rotations per minute (rpm)
25 degrees C.
Measuring time: three minutes The surface tension of the aqueous clear ink is preferably 35 mN/m or less and more preferably 32 mN/m or less at 25 degrees C. in terms that the ink is suitably leveled on a recording medium and the drying time of the ink is shortened.

The pH of the aqueous clear ink is preferably from 7 to 12 and more preferably from 8 to 11 in terms of prevention of corrosion of metal materials in contact with the white ink.

Substrate

The substrate is not limited to articles used as a recording medium. For example, it is suitable to use building materials such as wall paper, floor material, and tiles, cloth for apparel such as T-shirts, textile, and leather. In addition, the configuration of the paths through which the recording medium is conveyed can be adjusted to use ceramics, glass, metal, etc., as the substrate.

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less between the start of the contact and 30 msec$^{1/2}$ later according to Bristow method.

For example, plastic films such as vinyl chloride resin film, polyethylene terephthalate (PET) film, acrylic resin film, polypropylene film, polyethylene film, and polycarbonate film are suitably used as the non-permeable substrate.

The substrate is not particularly limited and the same substrate can be used both in the high gloss printing mode and the low gloss printing mode. In the present disclosure, in the low gloss printing mode, using a substrate demonstrating a high gloss is preferable. Substrates demonstrating a high gloss easily emphasize matte effect by clear ink, which is preferable.

In the high gloss printing mode, using a substrate demonstrating a low gloss is preferable. Substrates demonstrating a low gloss easily emphasize gloss effect by clear ink, which is preferable.

Therefore, when the degree of gloss of the substrate to be used in the low gloss printing mode is Glow and the degree of gloss of the substrate to be used in the high gloss printing mode is Ghigh, the following relationship is satisfied: Glow>Ghigh, and preferably Glow−Ghigh≥100.

Method of Controlling Degree of Gloss of Printed Image

The gloss level of an image is controlled by the method of controlling the gloss level of images which includes discharging a liquid containing a clear ink containing water and a resin to a substrate to form a printing layer thereon and heating the substrate. The method has a low gloss printing mode to impart low gloss to the printed image and a high gloss printing mode to impart high gloss to the printed image. The heating temperature is controlled to be high to print in the low gloss printing mode and to be high to print in the high gloss printing mode. In the low gloss printing mode, the root mean square gradient Sdq of the surface of the printing layer is increased or the heating temperature is raised. In the high gloss printing mode, the root mean square gradient Sdq of the surface of the printing layer is decreased or the heating temperature is lowered.

Printed Matter

The printed matter relating to the present disclosure has a substrate and a printing layer on the substrate, wherein the printing layer contains a clear ink layer containing a resin, and the printed matter has a low gloss printed image printed in a low gloss printing mode and a high gloss printed image printed in a high gloss printing mode. Also, the following relationship is satisfied:

in the high gloss printing mode, Gp≥Gm, and, in the low gloss printing mode, Gm≥Gp, where Gm represents a gloss level of the substrate and Gp represents a gloss level of the printing layer.

The printed matter is formed by forming an image by an inkjet recording device and an inkjet printing method.

Recording Device and Recording Method

Hereinafter, an example in which black (K), cyan (C), magenta (M), and yellow (Y) are used in the description of the following recording device and the following recording method. It is possible to use the aqueous clear ink in place of or in addition to those inks.

The clear ink for use in the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium and a continuous printer capable of using continuous paper rolled up in a roll-like form as a recording medium.

In the present disclosure, the recording device and the recording method respectively represent a device capable of discharging ink, various processing liquids, etc., to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 2:
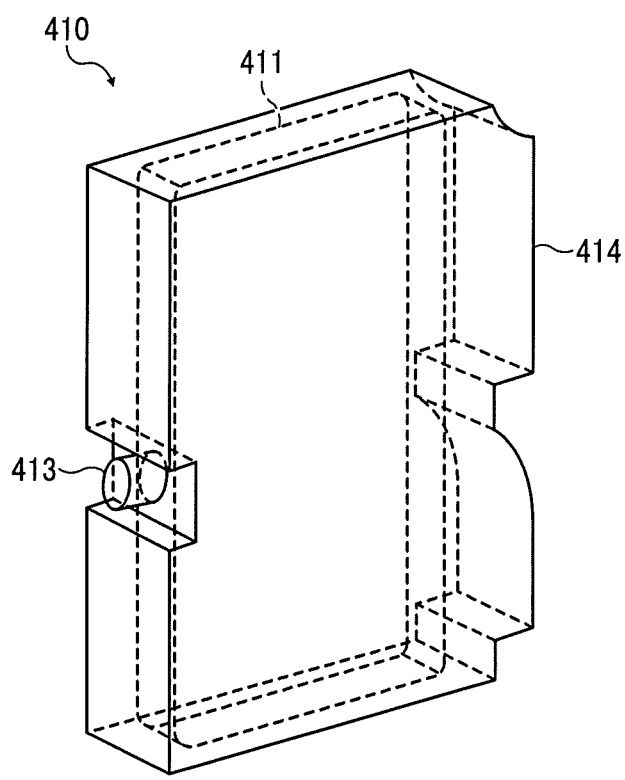
FIG. 2 is a diagram illustrating a perspective view of an example of the main tank of the image forming device illustrated in FIG. 1.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410*k*, 410*c*, 410*m*, and 410*y*) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401*c* is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

This recording device may include not only a portion to discharge ink but also a device referred to as a pre-processing device, a post-processing device, etc.

As an example of the pre-processing device and the post-processing device, like black (K), cyan (C), magenta (M), and yellow (Y) ink as in the case of the ink, the pre-processing device and the post-processing device may further include a liquid accommodating unit including a pre-processing fluid or a post-processing fluid and a liquid discharging head to discharge the pre-processing fluid or the post-processing fluid according to an printing method.

Figure 3:
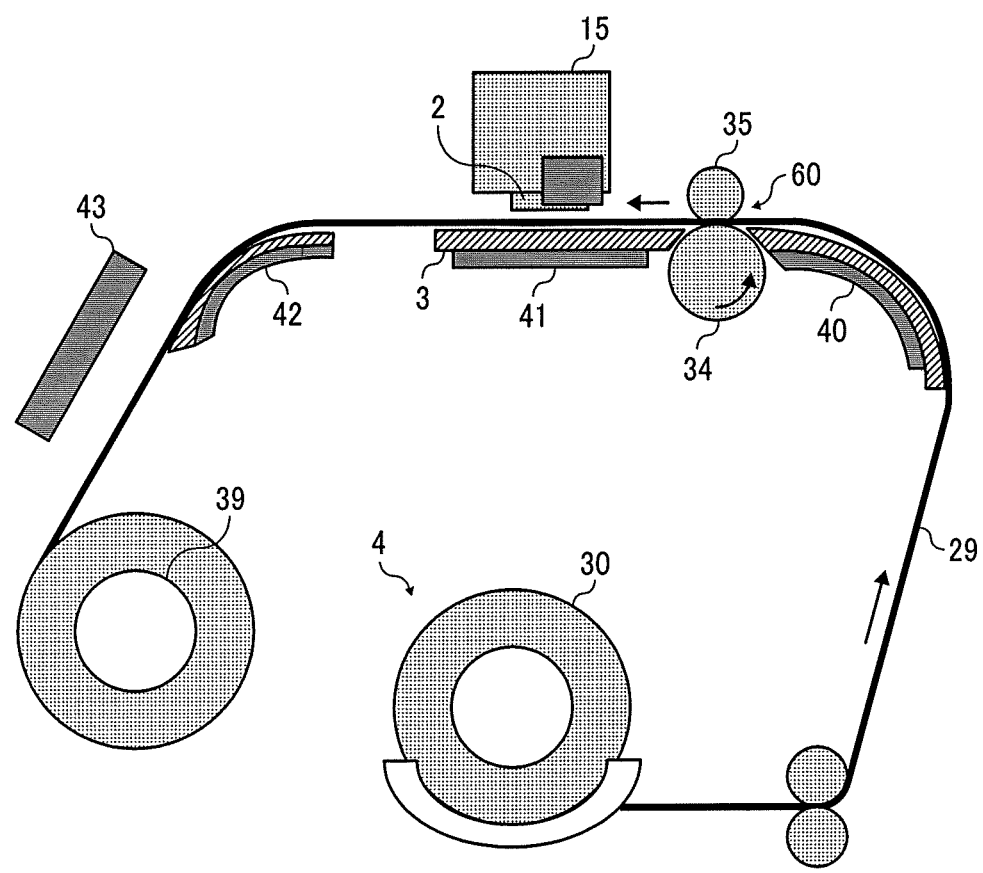
FIG. 3 is a diagram illustrating the inside of a printing device.

As another example of the pre-processing device and the post-processing device, it is suitable to dispose a pre-processing device and a post-processing device which do not employ the printing method but a blade coating method, a roll coating method, or a spray coating method. FIG. 3 is a diagram illustrating the inside of a printing device, which includes a recording head 2, a platen 3, a roll media storage unit 4, and heating devices, etc.

A carriage 15 carries a recording head as a discharging device to discharge ink droplets that includes clear ink and other optional color inks such as black (K), yellow (Y), magenta (M), and cyan (C).

In addition, the roll medium accommodating unit 4 is a medium feeding device where a roll medium (recording medium) 30 as the substrate is set.

A conveying device 60 is formed of a conveying roller 34 and a pressing roller 35 which face each other while sandwiching the platen 3 from top and bottom.

While a recording medium (substrate) 29 is nipped between the conveying roller 34 and the pressing roller 35, the conveying roller 34 is rotated in the direction indicated by the arrow to convey forward the recording medium 29 conveyed onto the platen 3.

In addition, there are provided a pre-heater 40 that preliminarily heats the recording medium 29, which is disposed upstream of the platen 3 in the recording medium conveying direction and a print heater 41 as the heating device that conducts heating when the clear ink is discharged from the recording head and attached onto the substrate.

Furthermore, on the upstream side of the recording head, a post heater 42 may be provided downstream of the platen 3. Because of the post heater 42, the recording medium 29 can be sequentially heated to promote drying of the landed ink droplets, which is preferable.

The pre-heater 40, the print heater 41, and the post heater 42 use conduction heating heater using ceramic or nichrome wire, etc.

Moreover, a hot air fun 43 is provided downstream of the starting point of the post heater 42 and blow the heated air to the recorded surface of the recording medium 29 on which the ink droplets have landed. Heated air is directly blown to the ink on the image-recorded surface by the hot air fun 43 so that the ink is completely dried. Thereafter the recording medium 29 is rolled up by a roll-up roller 39.

How to use the ink is not limited to the inkjet recording method.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

FIG. 3 is a diagram illustrating the inside of an inkjet printing device, which includes a recording head 2, a platen 3, a roll media storage unit 4, and heating devices, etc.

A carriage 15 carries a recording head as a discharging device to discharge ink droplets that includes clear ink and other optional color inks such as black (K), yellow (Y), magenta (M), and cyan (C).

In addition, the roll medium accommodating unit 4 is a medium feeding device where a roll medium (recording medium) 30 as the substrate is set.

A conveying device 60 is formed of a conveying roller 34 and a pressing roller 35 which face each other while sandwiching the platen 3 from top and bottom.

While a recording medium (substrate) 29 is nipped between the conveying roller 34 and the pressing roller 35, the conveying roller 34 is rotated in the direction indicated by the arrow to convey forward the recording medium 29 conveyed onto the platen 3.

In addition, there are provided a pre-heater 40 that preliminarily heats the recording medium 29, which is disposed upstream of the platen 3 in the recording medium conveying direction and a print heater 41 as the heating device that conducts heating when the clear ink is discharged from the recording head and attached onto the substrate.

Furthermore, on the upstream side of the recording head, a post heater 42 may be provided downstream of the platen 3. Because of the post heater 42, the recording medium 29 can be sequentially heated to promote drying of the landed ink droplets, which is preferable.

The pre-heater 40, the print heater 41, and the post heater 42 use conduction heating heater using ceramic or nichrome wire, etc.

Moreover, a hot air fun 43 is provided downstream of the starting point of the post heater 42 and blow the heated air to the recorded surface of the recording medium 29 on which the ink droplets have landed. Heated air is directly blown to the ink on the recorded surface by the hot air fun 43 so that the ink is completely dried. Thereafter the recording medium 29 is rolled up by a roll-up roller 39.

The usage of the ink is not particularly limited and can be suitably selected to suit to a particular application. For example, the ink can be used for printed low gloss, a paint, a coating material, and foundation. The ink can be used to form two-dimensional texts and images and furthermore a three-dimensional solid object (solid fabrication object or solid freeform fabrication object) as a material for 3D modeling.

The solid fabrication apparatus to fabricate a solid fabrication object can be any known device with no particular limit. For example, the apparatus includes a container, a supplying device, and a discharging device, a drier, etc., of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured from recorded matter or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1

Preparation of Polycarbonate-based Urethane Resin Emulsion 1

1,500 parts of polycarbonate diol (reaction product of 1,6-hexane diol and dimethyl carbonate, number average molecular weight (Mn) of 1200), 220 parts of 2,2-dimethylol propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60 degrees C. to dissolve DMPA.

Thereafter, 1,445 parts of 4,4'-dicyclohexyl methane diisocyanate and 2.6 parts of dibutyl tin dilaurylate (catalyst) were added thereto and the resultant was heated to 90 degrees C. to complete urethanation reaction in five hours. As a result, a urethane prepolymer having an isocyanate group at its distal end was obtained. This reaction mixture was cooled down to 80 degrees C. and 149 parts of triethyl amine was admixed therewith. 4,340 parts of the resultant mixture was extracted and charged in a liquid mixture of 5,400 parts of water and 15 parts of triethyl amine during vigorous stirring.

Thereafter, 1,500 parts of ice and 626 parts of 35 percent by mass 2-methyl-1,5-pentane diamine aqueous solution were added to conduct chain elongation reaction followed by distillation away of the solvent in such a manner that the solid portion concentration was 30 percent by mass to obtain polycarbonate-based polyurethane resin emulsion 1.

The thus-obtained polycarbonate-based-polyurethane resin emulsion was measured by a film forming temperature test instrument (manufactured by Imoto Machinery Co., Ltd.). The minimum film forming temperature was 55 degrees C.

Preparation Example 2

Preparation of Acrylic Resin Emulsion 1

900 parts of deionized water and 1 part of sodium lauryl sulfate were charged in a reaction container equipped with a stirrer, a reflux condenser, a dripping device, and a thermometer and heated to 70 degrees C. while replacing nitrogen during stirring. While keeping the temperature inside at 70 degrees C., 4 parts of potassium persulfate was added as polymerization initiator and dissolved. An emulsified material, which was preliminarily prepared by adding 3 parts of lauryl sulfate sodium, 20 parts of acrylamide, 365 parts of styrene, 545 parts of butyl acrylate, and 10 parts of methacrylic acid to 450 parts of deionized water while being stirred, was continuously dripped to the reaction solution in four hours. After the dripping, the resultant was rested for three hours. After the thus-obtained aqueous emulsion was cooled down to room temperature, deionized water and sodium hydroxide aqueous solution were added to adjust pH of the solution to 8 to obtain an acrylic resin emulsion 1 (solid portion of 30 percent by mass).

Manufacturing Example 1

Manufacturing of Clear Ink A

Polyurethane resin emulsion 1 of 25 percent by mass Preparation Example 1 (solid portion concentration of 30 percent by mass), 19 percent by mass 1,2-propanediol, 11 percent by mass 1,3-propanediol, 3 percent by mass 1,2-butanediol, 6 percent by mass a fluorochemical surfactant (FS-300, solid portion concentration of 40 percent by mass, manufactured by E.I. du Pont de Nemours and Company), and 36 percent by mass of highly pure water were admixed and stirred to prepare a mixture.

Subsequently, the thus-obtained mixture was filtrated with a polypropylene filter (Betafine polypropylene pleat filter PPG series, manufactured by 3M company) with an average pore diameter of 0.2 micrometer to obtain clear ink A.

Examples 2 to 5

Manufacturing of Clear Inks B to E

Clear inks B to E were manufactured in the same manner as in Manufacturing Example 1 except that the ink composition was changed as shown in Table 1.

Manufacturing Example 6

Manufacturing of Magenta Ink

Preparation of Self-Dispersible Magenta Pigment Dispersion

After preliminarily mixing the following recipe, the mixture was subject to circulation dispersion for seven hours with a disk type bead mill (KDL type, media: zirconia ball having a diameter of 0.3 mm, manufactured by SHINMARU ENTERPRISES CORPORATION) to obtain a magenta pigment dispersion (concentration of pigment solid portion: 15 percent by mass) of self dispersion type.

Pigment Red 122 (Toner Magenta E002, manufactured by Clariant (Japan) K.K.): 15 parts by mass Anionic surfactant (Pionine A-51-B, manufactured by TAKEMOTO OIL & FAT Co., Ltd.): 2 parts Deionized water: 83 parts Manufacturing of Magenta Ink 25 percent by mass polyurethane resin emulsion 1 of Preparation Example 1 (solid portion concentration of 30 percent by mass), 20 percent by mass self-dispersible magenta pigment dispersion (pigment solid portion concentration of 15 percent by mass), 20 percent by mass 1,2-propanediol, 11 percent by mass 1,3-propanediol, 3 percent by mass 1,2-butanediol, 6 percent by mass a fluorochemical surfactant (FS-300, solid portion concentration of 40 percent by mass, manufactured by E.I. du Pont de Nemours and Company), and 15 percent by mass highly pure water were admixed and stirred to prepare a mixture.

Thereafter, the thus-obtained mixture was filtrated with a polypropylene filter (Betafine polypropylene pleat filter PPG series, manufactured by 3M company) with an average pore diameter of 0.2 micrometer to obtain a magenta ink.

TABLE 1

| | | Manufacturing Example 1 Clear ink A | Manufacturing Example 2 Clear ink B | Manufacturing Example 3 Clear ink C | Manufacturing Example 4 Clear ink D | Manufacturing Example 5 Clear ink E |
|---|---|---|---|---|---|---|
| Resin | Polyurethane resin emulsion 1 (water dispersibility, solid portion concentration of 30 percent by mass) | 25 | 30 | 30 | 40 | — |
| | Acrylic resin emulsion 1 (water dispersibility, solid portion concentration of 30 percent by mass) | — | — | — | — | 40 |
| Water | Highly pure water | 36 | 32.6 | 33.5 | 26.5 | 26.5 |
| Surfactant | FS-300 (solid portion concentration of 40 percent by mass, manufactured by E.I. du Pont de Nemours and Company) | 6 | 6 | 4.5 | 4.5 | 4.5 |
| Organic solvent | 1,2-Propane diol | 19 | 17.4 | 18 | 15 | 15 |
| | 1,3-Propane diol | 11 | 11 | 11 | 11 | 11 |
| | 1,2-Butane diol | 3 | 3 | 3 | 3 | 3 |
| Total (Percent by mass) | | 100 | 100 | 100 | 100 | 100 |
| Solid portion concentration of resin in clear ink (percent by mass) | | 7.5 | 9 | 9 | 12 | 12 |

Example 1

Inkjet Printing

An ink cartridge of an inkjet printer (GXe5500 remodeled machine, manufactured by Ricoh Co., Ltd.) was filled with the clear ink A of Manufacturing Example 1. Thereafter, the ink cartridge filled with the ink was mounted to the inkjet printer GXe5500 remodeled machine followed by inkjet printing.

The inkjet printer GXe 5500 remodeled machine was provided with a heater (temperature control controller, model MTCD, available from MISUMI, Inc.) so that the recording medium could be heated from the back side before printing, during printing, and after printing. This enabled printing on the recording medium heated by the heater before printing and during printing, and enabled the heater to heat and dry the printed matter after printing.

Printing was conducted while changing the type of recording media, heating conditions, and printing images depending on the high gloss printing mode and the low gloss printing mode.

Recording Medium

In the high gloss printing mode, synthetic paper VJFN160 (white polypropylene film, gloss level 16 (60° gloss value), manufactured by Yupo Corporation) was used as the recording medium 1.

In the low gloss printing mode, a window film GIY-0305 (transparent polyethylene terephthalate (PET) film, gloss level 159 (60° gloss value), manufactured by Lintec Corporation) was used as the recording medium 2.

Heating Condition

In the high gloss printing mode, the heating temperatures of each heater (heating device) disposed before printing, during printing, and after printing were set at 60 degrees C., 60 degrees C., and 70 degrees C. In the low gloss printing mode, the heating temperature of each heater (heating device) was set at 65 degrees C., 65 degrees C., and 70 degrees C. When measuring the temperature of the recording medium during printing, the recording medium temperature (Thigh) in the high gloss printing mode was 59 degrees C., and the temperature (HThigh) of the heating device during printing in the high gloss printing mode was 60 degrees C. When measuring the temperature of the recording medium during printing, the recording medium temperature (Tlow) in the low gloss printing mode was 64 degrees C., and the temperature (HTlow) of the heating device during printing in the low gloss printing mode was 65 degrees C.

The temperature of the recording medium during printing was measured with a digital radiation temperature sensor (FT-H10, manufactured by Keyence Corporation).

The image printed in the high gloss printing mode was an all-solid image having an image resolution of 600 dpi×600 dpi with a printing ratio of 100 percent.

The image printed in the low gloss printing mode was a half-tone image having an image resolution of 600 dpi×600 dpi with a printing ratio of 40 percent.

Printing Ratio

The printing ratio means the following:

Print ratio (percent)=number of clear ink printing dots/(vertical resolution×horizontal resolution)×100

In the above formula, "the number of clear ink printing dots" means the number of dots actually printed with clear ink per unit area, and "vertical resolution" and "horizontal resolution" are represented in resolutions per unit area. When clear ink is disposed at the same dot position in an overlapping manner for printing, "the number of clear ink printing dots" represents the total number of dots per unit area actually used for printing with clear ink.

Clear ink A was printed directly on the recording medium in both the low gloss printing mode and the high gloss printing mode.

Next, the gloss level and the root mean square gradient Sdq were measured for the obtained printed matter as follows, and the gloss feeling was evaluated. The results are shown in Table 3.

Gloss Level

The 60° gloss value was measured for the obtained printed matter using a gloss measurement device (Micro Trigloss, manufactured by BYK Chemie GmbH). At this time, the gloss level at any three points on the surface of the portion printed with the clear ink A of the printed matter was measured. The average value of the gloss level was Gp and the gloss level of the surface of the non-printed portion of the printed matter was Gm.

Root Mean Square Gradient Sdq

ISO 25178 surface quality (ISO 25178 parameter) was measured for any one point in the printed portion of the obtained printed matter using a scanning white microscope (VS1530 manufactured by Hitachi High-Technologies Corporation). Sdqm−Sdqp in the high gloss printing mode and Sdqp−Sdqm in the low gloss printing mode were calculated. Sdqp represents Sdq of the surface of the portion printed with clear ink A of the printed matter and Sdqm represents Sdq of the surface of the recording medium of the non-printed portion.

Gloss Feeling (Low Gloss Feeling or High Gloss Feeling)

The obtained printed matter was visually evaluated based on the following criteria.

The gloss feeling was evaluated in the high gloss printing mode, and the matte feeling was evaluated in the low gloss printing mode. A and B were determined as allowable and C was determined as not allowable.

Evaluation Criteria

A: The clear ink printed portion feels more glossy or matte than the clear ink unprinted portion B: The clear ink printed portion feels more glossy or matte than the clear ink unprinted portion, but not distinguishable unless it is clearly seen C: The clear ink printed portion feels gloss or matte less or weaker than the clear ink unprinted portion

Example 2

Inkjet printing was conducted in the same manner as in Example 1 except that the image printed in the high gloss printing mode was changed to a halftone image having an image resolution of 600 dpi×600 dpi with a printing ratio of 75 percent and the image printed in the low gloss printing mode was changed to a halftone image having an image resolution of 600 dpi×600 dpi with a printing ratio of 80 percent.

Next, the gloss level and the root mean square gradient Sdq of the obtained printed matter were measured in the same manner as in Example 1 to evaluate the gloss feeling. The results are shown in Table 3.

Example 3

Inkjet printing was conducted in the same manner as in Example 1 except that the heating conditions were set at 50 degrees C., 50 degrees C., and 70 degrees C. for the heating temperatures of each heater before printing, during printing, and after printing in the high gloss printing mode and the heating conditions were set at 70 degrees C., 70 degrees C., and 70 degrees C. for the heating temperatures of each heater before printing, during printing, and after printing in the low gloss printing mode.

Next, the gloss level and the root mean square gradient Sdq of the obtained printed matter were measured in the same manner as in Example 1 to evaluate the gloss feeling. The results are shown in Table 3.

When measuring the temperature of the recording medium during printing, the recording medium temperature (Thigh) in the high gloss printing mode was 49 degrees C., and the temperature (HThigh) of the heating device during printing in the high gloss printing mode was 50 degrees C. When measuring the temperature of the recording medium during printing, the recording medium temperature (Tlow) in the low gloss printing mode was 68 degrees C., and the temperature (HTlow) of the heating device during printing in the low gloss printing mode was 70 degrees C.

Example 4

Inkjet printing was conducted in the same manner as in Example 3 except that the clear ink A of Manufacturing Example 1 was changed to the clear ink B of Manufacturing Example 2.

Next, the gloss level and the root mean square gradient Sdq of the obtained printed matter were measured in the same manner as in Example 1 to evaluate the gloss feeling. The results are shown in Table 3.

Example 5

Inkjet printing was conducted in the same manner as in Example 3 except that the clear ink A of Manufacturing Example 1 was changed to the clear ink C of Manufacturing Example 3.

Next, the gloss level and the root mean square gradient Sdq of the obtained printed matter were measured in the same manner as in Example 1 to evaluate the gloss feeling. The results are shown in Table 3.

Example 6

Inkjet printing was conducted in the same manner as in Example 3 except that the clear ink A of Manufacturing Example 1 was changed to the clear ink D of Manufacturing Example 4.

Next, the gloss level and the root mean square gradient Sdq of the obtained printed matter were measured in the same manner as in Example 1 to evaluate the gloss feeling. The results are shown in Table 3.

Example 7

Inkjet printing was conducted in the same manner as in Example 3 except that the clear ink A of Manufacturing Example 1 was changed to the clear ink E of Manufacturing Example 5.

Next, the gloss level and the root mean square gradient Sdq of the obtained printed matter were measured in the same manner as in Example 1 to evaluate the gloss feeling. The results are shown in Table 3.

Example 8

Inkjet printing was conducted in the same manner as in Example 7 except that the recording medium printed with the magenta ink of Manufacturing Example 6 was used. That is, the clear ink E was printed on the coating film formed of the magenta ink.

The magenta ink of Manufacturing Example 6 was used for printing on the recording medium. The same printing machine for clear ink E was used for printing only with the magenta ink to form magenta ink film at the heating temperature of each heater of 50 degrees C. before printing, 50 degrees C. during printing, and 70 degrees C. after printing in the high gloss printing mode and at the heating temperature of each heater of 70 degrees C. before printing, 70 degrees C. during printing, and 70 degrees C. after printing in the low gloss printing mode. The magenta printing image was a solid image printed with an image resolution of 600 dpi×600 dpi with a print ratio of 100 percent.

The printing device was used to print again with clear ink E on the recording medium on which the magenta ink film was formed.

The gloss level of the thus-obtained printed matter was measured in the same manner as in Example 1. The results are shown in Table 3.

Comparative Example 1

Inkjet printing was conducted in the same manner as in Example 1 except that the image printed in the high gloss printing mode was changed to a halftone image having an image resolution of 600 dpi×600 dpi with a printing ratio of 80 percent, the image printed in the low gloss printing mode was changed to a halftone image having an image resolution of 600 dpi×600 dpi with a printing ratio of 80 percent, the heating temperature of each heater was changed to 70 degrees C. before printing, 70 degrees C. during printing, and 70 degrees C. after printing in the high gloss printing mode and the heating temperature of each heater was changed to 55 degrees C. before printing, 55 degrees C. during printing, and 55 degrees C. after printing in the low gloss printing mode.

Next, the gloss level and the root mean square gradient Sdq of the obtained printed matter were measured in the same manner as in Example 1 to evaluate the gloss feeling. The results are shown in Table 3.

When measuring the temperature of the recording medium during printing, the recording medium temperature (Thigh) in the high gloss printing mode was 68 degrees C., and the temperature (HThigh) of the heating device during printing in the high gloss printing mode was 70 degrees C. When measuring the temperature of the recording medium during printing, the recording medium temperature (Tlow) in the low gloss printing mode was 54 degrees C., and the temperature (HTlow) of the heating device during printing in the low gloss printing mode was 55 degrees C.

Comparative Example 2

Inkjet printing was conducted in the same manner as in Example 1 except that the image printed in the high gloss printing mode was changed to a halftone image having an image resolution of 600 dpi×600 dpi with a printing ratio of 50 percent, the image printed in the low gloss printing mode was changed to a halftone image having an image resolution of 600 dpi×600 dpi with a printing ratio of 80 percent, the heating temperature of each heater was changed to 70 degrees C. before printing, 70 degrees C. during printing, and 70 degrees C. after printing in the high gloss printing mode and the heating temperature of each heater was changed to 40 degrees C. before printing, 40 degrees C. during printing, and 70 degrees C. after printing in the low gloss printing mode.

Next, the gloss level and the root mean square gradient Sdq of the obtained printed matter were measured in the same manner as in Example 1 to evaluate the gloss feeling. The results are shown in Table 3.

When measuring the temperature of the recording medium during printing, the recording medium temperature (Thigh) in the high gloss printing mode was 68 degrees C., and the temperature (HThigh) of the heating device during printing in the high gloss printing mode was 70 degrees C. When measuring the temperature of the recording medium during printing, the recording medium temperature (Thigh) in the low gloss printing mode was 49 degrees C., and the temperature (HTlow) of the heating device during printing in the low gloss printing mode was 50 degrees C.

Comparative Example 3

The recording medium of Example 1 was subject to printing using the solid image printed in the high gloss printing mode in Example 1 and the magenta ink of Manufacturing Example 6, The same solid image was used in both the low gloss printing mode and the high gloss printing mode. The same printing device as for clear ink was used for the magenta ink. The heating conditions were set at 50 degrees C., 50 degrees C., and 70 degrees C. for the heating temperatures of each heater before printing, during printing, and after printing, respectively, in the high gloss printing mode and 70 degrees C., 70 degrees C., and 70 degrees C. for the heating temperatures of each heater before printing, during printing, and after printing, respectively, in the low gloss printing mode.

Next, the gloss level and the root mean square gradient Sdq of the obtained printed matter were measured in the same manner as in Example 1 to evaluate the gloss feeling. The results are shown in Table 3.

When measuring the temperature of the recording medium during printing, the recording medium temperature (Thigh) in the high gloss printing mode was 49 degrees C., and the temperature (HThigh) of the heating device during printing in the high gloss printing mode was 50 degrees C. When measuring the temperature of the recording medium during printing, the recording medium temperature (Tlow) in the low gloss printing mode was 68 degrees C., and the temperature (HTlow) of the heating device during printing in the low gloss printing mode was 70 degrees C.

TABLE 2

| | | | | | Printing condition | | | |
| --- | --- | --- | --- | --- | --- | --- | --- | --- |
| | | | | | | | Heater temperature | |
| | Ink type | Printing mode | Recording medium | Printed image | Printing ratio | Heater before printing | Heater during printing (HThigh, HTlow) | Heater after printing |
| Recording medium 1 | — | — | VJFN 160 | — | — | — | — | — |
| Recording medium 2 | — | — | GIY0305 | — | — | — | — | — |
| Example 1 | Clear ink A | High gloss | VJFN 160 | Solid image | 100% | 60° C. | 60° C. | 70° C. |
| | | Low gloss | GIY0305 | Halftone image | 40% | 65° C. | 65° C. | 70° C. |
| Example 2 | Clear ink A | High gloss | VJFN 160 | Halftone image | 75% | 60° C. | 60° C. | 70° C. |
| | | Low gloss | GIY0305 | Halftone image | 80% | 65° C. | 65° C. | 70° C. |
| Example 3 | Clear ink A | High gloss | VJFN 160 | Solid image | 100% | 50° C. | 50° C. | 70° C. |
| | | Low gloss | GIY0305 | Halftone image | 40% | 70° C. | 70° C. | 70° C. |
| Example 4 | Clear ink B | High gloss | VJFN 160 | Solid image | 100% | 50° C. | 50° C. | 70° C. |
| | | Low gloss | GIY0305 | Halftone image | 40% | 70° C. | 70° C. | 70° C. |
| Example 5 | Clear ink C | High gloss | VJFN 160 | Solid image | 100% | 50° C. | 50° C. | 70° C. |
| | | Low gloss | GIY0305 | Halftone image | 40% | 70° C. | 70° C. | 70° C. |
| Example 6 | Clear ink D | High gloss | VJFN 160 | Solid image | 100% | 50° C. | 50° C. | 70° C. |
| | | Low gloss | GIY0305 | Halftone image | 40% | 70° C. | 70° C. | 70° C. |
| Example 7 | Clear ink E | High gloss | VJFN 160 | Solid image | 100% | 50° C. | 50° C. | 70° C. |
| | | Low gloss | GIY0305 | Halftone image | 40% | 70° C. | 70° C. | 70° C. |
| Example 8 | Clear ink E + magenta ink | High gloss | VJFN 160 | Solid image | 100% | 50° C. | 50° C. | 70° C. |
| | | Low gloss | GIY0305 | Halftone image | 40% | 70° C. | 70° C. | 70° C. |
| Comparative Example 1 | Clear ink A | High gloss | VJFN 160 | Halftone image | 80% | 70° C. | 70° C. | 70° C. |
| | | Low gloss | GIY0305 | Halftone image | 80% | 55° C. | 55° C. | 70° C. |

TABLE 2-continued

| | | | | | Printing condition | | | |
| | | | | | | | Heater temperature | |
| | Ink type | Printing mode | Recording medium | Printed image | Printing ratio | Heater before printing | Heater during printing (HThigh, HTlow) | Heater after printing |
|---|---|---|---|---|---|---|---|---|
| Comparative Example 2 | Clear ink A | High gloss | VJFN 160 | Halftone image | 50% | 70° C. | 70° C. | 70° C. |
| | | Low gloss | GIY0305 | Halftone image | 80% | 40° C. | 40° C. | 70° C. |
| Comparative Example 3 | Magenta ink | High gloss | VJFN 160 | Solid image | 100% | 50° C. | 50° C. | 70° C. |
| | | Low gloss | GIY0305 | Solid image | 100% | 70° C. | 70° C. | 70° C. |

TABLE 3

| | | Temperature of recording medium during printing | Degree of gloss | | | | | Gloss: Sdqm − Sdqp Matte: Sdqp − Sdqm | Gloss feeling |
|---|---|---|---|---|---|---|---|---|---|
| | | | Gp | Gm | Gp − Gm | Sdqm | Sdqp | | |
| Recording medium 1 | — | — | — | 16 | — | 0.080 | — | — | — |
| Recording medium 2 | — | — | — | 159 | — | 0.0026 | — | — | — |
| Example 1 | Thigh | 59° C. | 57 | 16 | 41 | — | 0.053 | 0.027 | B |
| | Tlow | 64° C. | 110 | 159 | −49 | — | 0.045 | 0.042 | B |
| Example 2 | Thigh | 59° C. | 37 | 16 | 21 | — | 0.068 | 0.012 | B |
| | Tlow | 64° C. | 128 | 159 | −31 | — | 0.030 | 0.027 | B |
| Example 3 | Thigh | 49° C. | 65 | 16 | 49 | — | 0.046 | 0.034 | A |
| | Tlow | 68° C. | 102 | 159 | −57 | — | 0.053 | 0.050 | A |
| Example 4 | Thigh | 49° C. | 68 | 16 | 52 | — | 0.044 | 0.036 | A |
| | Tlow | 68° C. | 95 | 159 | −64 | — | 0.058 | 0.055 | A |
| Example 5 | Thigh | 49° C. | 66 | 16 | 50 | — | 0.046 | 0.034 | A |
| | Tlow | 68° C. | 84 | 159 | −75 | — | 0.067 | 0.064 | A |
| Example 6 | Thigh | 49° C. | 70 | 16 | 54 | — | 0.043 | 0.037 | A |
| | Tlow | 68° C. | 77 | 159 | −82 | — | 0.074 | 0.071 | A |
| Example 7 | Thigh | 49° C. | 71 | 16 | 55 | — | 0.042 | 0.038 | A |
| | Tlow | 68° C. | 82 | 159 | −77 | — | 0.069 | 0.066 | A |
| Example 8 | Thigh | 49° C. | 66 | 16 | 50 | — | 0.046 | 0.034 | A |
| | Tlow | 68° C. | 87 | 159 | −72 | — | 0.053 | 0.050 | A |
| Comparative Example 1 | Thigh | 68° C. | 30 | 16 | 14 | — | 0.086 | −0.006 | C |
| | Tlow | 54° C. | 160 | 159 | 1 | — | 0.002 | −0.001 | C |
| Comparative Example 2 | Thigh | 68° C. | 12 | 16 | −4 | — | 0.087 | −0.007 | C |
| | Tlow | 40 degrees C. | 162 | 159 | 3 | — | 0.001 | −0.002 | C |
| Comparative Example 3 | Thigh | 49° C. | 30 | 16 | 14 | — | 0.078 | 0.002 | C |
| | Tlow | 68° C. | 102 | 159 | −57 | — | 0.041 | 0.038 | B |

As seen in the results shown in Table 2 and Table 3, with regard to the gloss level, it was possible to change the gloss level by changing the printing ratio and the heating temperature even with the same ink.

With regard to Sdq, according to the comparison of Examples 1 to 8 and Comparative Examples 1 and 2, in general, those having low gloss level had a large Sdq and conversely, those having high gloss level had a small Sdq.

With regard to the gloss level, according to the comparison of Examples 1 to 8 and Comparative Examples 1 and 2, sufficient gloss feeling and matte feeling were found to be demonstrated when Sdqm≥Sdqp was satisfied in the high gloss printing mode and when Sdqp≥Sdqm was satisfied in the low gloss printing mode. According to the comparison of Examples 1 to 8 and Comparative Examples 1 and 2, excellent gloss feeling and matte feeling were found to be demonstrated when Sdqm−Sdqp≥0.03 was satisfied in the high gloss printing mode and when Sdqp−Sdqm≥0.05 was satisfied in the low gloss printing mode. Moreover, according to the comparison of Example 8 and Comparative Example 3, a larger difference in gloss level, more excellent gloss feeling, and matte feeling were demonstrated in the case of printing with just color ink than in the case of printing with clear ink on the color ink.

Aspects of the present disclosure are, for example, as follows.

1. The printing device according to an embodiment of the present disclosure includes an ink container accommodating a liquid containing a clear ink containing water and a resin, a discharging head configured to discharge the clear ink directly or indirectly onto a substrate to form a printing layer, and a heating device configured to heat the substrate, wherein the following relationship is satisfied: Tlow (degrees C.)>Thigh (degrees C.), where Tlow (degrees C.) represents the temperature of the substrate that the heating device is heating during printing in a low gloss printing mode in which the clear ink is directly or indirectly discharged and attached to the substrate to impart low gloss to the printing layer and Thigh (degrees C.) represents the temperature of the substrate that the heating device is heating during printing in a high gloss printing mode in which the clear ink is directly or indirectly discharged and attached to the substrate to impart high gloss to the printing layer, wherein the following relationships are satisfied: in the high gloss printing mode, Gp≥Gm, and, in the low gloss printing mode, Gm≥Gp, where Gm represents the gloss level of the substrate and Gp represents the gloss level of the printing layer.

2. An inkjet printing device includes an ink container accommodating a liquid containing a clear ink containing water and a resin, a discharging head configured to discharge the clear ink directly or indirectly onto a substrate to form a printing layer and a heating device configured to heat the substrate, wherein the following relationship is satisfied: HTlow (degrees C.)>HThigh (degrees C.), where HTlow (degrees C.) represents the temperature of the heating device during printing in a low gloss printing mode in which the clear ink is directly or indirectly discharged and attached to the substrate to impart low gloss to the printing layer and HThigh (degrees C.) represents the temperature of the heating device in a high gloss during printing in a high gloss printing mode in which the clear ink is directly or indirectly discharged and attached to the substrate to impart high gloss to the printing layer. wherein the following relationships are satisfied: in the high gloss printing mode, Gp≥Gm, and, in the low gloss printing mode, Gm≥Gp, where Gm represents the gloss level of the substrate and Gp represents the gloss level of the printing layer.

3. The printing device according to 1 or 2 mentioned above, wherein, in the high gloss printing mode, Gp−Gm≥20 and, in the low gloss printing mode, Gm−Gp≥30.

4. The printing device according to any one of 1 to 3 mentioned above, wherein, in the high gloss printing mode, Sdqm≥Sdqp, and, in the low gloss mode, Sdqp≥Sdqm, where Sdqm represents root mean square gradient Sdq of the substrate and Sdqp represents root mean square gradient Sdq of the surface of the printing layer.

5. The printing device according to 4 mentioned above, wherein, in the high gloss printing mode, Sdqm−Sdqp≥0.03 and, in the low gloss printing mode, Sdqp−Sdqm≥0.05.

6. The printing device according to any one of 1 to 5 mentioned above, wherein the following relationship is satisfied: Glow>Ghigh, where Glow represents the degree of gloss of the substrate for use in the low gloss printing mode and Ghigh represents the degree of gloss of the substrate for use in the high gloss printing mode.

7. The printing device according to any one of 1 to 6 mentioned above, wherein the proportion of the resin in the clear ink is 8 percent by mass or more.

8. The printing device according to any one of 1 to 7 mentioned above, wherein the resin includes a polyurethane resin.

9. The printing device according to any one of 1 to 8 mentioned above, wherein the clear ink further contains a surfactant and the proportion of the surfactant in the clear ink is 2.00 percent by mass or less.

10. The printing device according to 9 mentioned above, wherein the surfactant is a fluorine surfactant.

11. A printing method according to an embodiment of the present disclosure includes discharging a liquid containing a clear ink containing water and a resin directly or indirectly onto a substrate to form a printing layer and heating the substrate by a heating device, wherein the following relationship is satisfied: Tlow (degrees C.)>Thigh (degrees C.), where Tlow (degrees C.) represents the temperature of the substrate that the heating device is heating during printing in a low gloss printing mode in which the aqueous clear ink is directly or indirectly discharged and attached to the substrate to impart low gloss to the printing layer and Thigh (degrees C.) represents the temperature of the substrate that the heating device is heating during printing in a high gloss printing mode in which the aqueous clear ink is directly or indirectly discharged and attached to the substrate to impart high gloss to the printing layer, wherein the following relationships are satisfied: in the high gloss printing mode, Gp≥Gm, and, in the low gloss printing mode, Gm≥Gp, where Gm represents the gloss level of the substrate and Gp represents the gloss level of the printing layer.

12. A printing method according to an embodiment of the present disclosure includes discharging a liquid containing a clear ink containing water and a resin directly or indirectly onto a substrate to form a printing layer and heating the substrate by a heating device, wherein the following relationship is satisfied: HTlow (degrees C.)>HThigh (degrees C.), where HTlow (degrees C.) represents the temperature of the heating device during printing in a low gloss printing mode in which the clear ink is directly or indirectly discharged and attached to the substrate to impart low gloss to the printing layer and HThigh (degrees C.) represents the temperature of the substrate that the heating device is heating during printing in a high gloss printing mode in which the clear ink is directly or indirectly discharged and attached to the substrate to impart high gloss to the printing layer, wherein the following relationship is satisfied: in the high gloss printing mode, Gp≥Gm, and, in the low gloss printing mode, Gm≥Gp, where Gm represents the gloss level of the substrate and Gp represents the gloss level of the printing layer.

13. The printing method according to 11 or 12 mentioned above, wherein, in the high gloss printing mode, Gp−Gm≥20 and, in the low gloss printing mode, Gm−Gp≥30.

14. The printing method according to any one of 11 to 13 mentioned above, wherein, in the high gloss printing mode, Sdqm≥Sdqp, and, in the low gloss mode, Sdqp≥Sdqm, where Sdqm represents root mean square gradient Sdq of the substrate and Sdqp represents root mean square gradient Sdq of a surface of the printing layer.

15. The printing method according to 14 mentioned above, wherein, in the high gloss printing mode, Sdqm−Sdqp≥0.03 and, in the low gloss printing mode, Sdqp−Sdqm≥0.05.

16. The printing method according to any one of 11 to 15 mentioned above, wherein the following relationship is satisfied: Glow>Ghigh, where Glow represents the degree of gloss of the substrate for use in the low gloss printing mode and Ghigh represents the degree of gloss of the substrate for use in the high gloss printing mode.

17. The printing method according to any one of 11 to 16 mentioned above, wherein the proportion of the resin in the clear ink is 8 percent by mass or more.

18. The printing method according to any one of 11 to 17 mentioned above, wherein the resin includes a polyurethane resin.

19. The printing method according to any one of 11 to 18 mentioned above, wherein the clear ink further contains a surfactant and the proportion of the surfactant in the clear ink is 2.00 percent by mass or less.

20. The printing method according to 19 mentioned above, wherein the surfactant is a fluorine surfactant.

21. A method of controlling gloss of a printed image includes discharging a liquid containing a clear ink containing water and a resin to a substrate to form a printing layer thereon and heating the substrate, wherein the method has a low gloss printing mode to impart low gloss to the printed image and a high gloss printing mode to impart high gloss to the printed image, wherein the heating temperature is controlled to be high to print in the low gloss printing mode and to be high to print in the high gloss printing mode. In the low gloss printing mode, the root mean square gradient Sdq of the surface of the printing layer is increased or the heating temperature is raised and, in the high gloss printing mode, the root mean square gradient Sdq of the surface of the printing layer is decreased or the heating temperature is lowered.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A printing device comprising:
   an ink container accommodating a liquid, the liquid comprising a clear ink comprising water and a resin;
   a discharging head configured to discharge the clear ink directly or indirectly onto a substrate to form a printing layer; and
   a heating device configured to heat the substrate,
   wherein the following relationship is satisfied:
   Tlow (degrees C.)>Thigh (degrees C.), where Tlow (degrees C.) represents a temperature of the substrate that the heating device is heating during printing in a low gloss printing mode in which the clear ink is directly or indirectly discharged and attached to the substrate to impart low gloss to the printing layer and Thigh (degrees C.) represents a temperature of the substrate that the heating device is heating during printing in a high gloss printing mode in which the clear ink is directly or indirectly discharged and attached to the substrate to impart high gloss to the printing layer,
   wherein the following relationships are satisfied:
   in the high gloss printing mode, Gp≥Gm and, in the low gloss printing mode, Gm≥Gp, where Gm represents a gloss level of the substrate and Gp represents a gloss level of the printing layer.

2. The printing device according to claim 1, wherein, in the high gloss printing mode, Gp−Gm≥20 and, in the low gloss printing mode, Gm−Gp≥30.

3. The printing device according to claim 1, wherein, in the high gloss printing mode, Sdqm≥Sdqp and, in the low gloss printing mode, Sdqp≥Sdqm, where Sdqm represents root mean square gradient Sdq of the substrate and Sdqp represents root mean square gradient Sdq of a surface of the printing layer.

4. The printing device according to claim 1, wherein, in the high gloss printing mode, Sdqm−Sdqp≥0.03 and, in the low gloss printing mode, Sdqp−Sdqm≥0.05.

5. The printing device according to claim 1, wherein a proportion of the resin in the clear ink is 8 percent by mass or more.

6. The printing device according to claim 1, wherein the resin comprises a polyurethane resin.

7. The printing device according to claim 1, wherein the clear ink further comprises a surfactant and a proportion of the surfactant in the clear ink is 2.00 percent by mass or less.

8. The printing device according to claim 1, wherein Gm and Gp are 60° gloss values.

9. A printing device comprising:
   an ink container accommodating a liquid, the liquid comprising a clear ink comprising water and a resin;
   a discharging head configured to discharge the clear ink directly or indirectly onto a substrate to form a printing layer; and
   a heating device configured to heat the substrate,
   wherein the following relationship is satisfied:
   HTlow (degrees C.)>HThigh (degrees C.), where HTlow (degrees C.) represents a temperature of the heating device during printing in a low gloss printing mode to impart low gloss to the printing layer and HThigh (degrees C.) represents a temperature of the heating device in a high gloss during printing in a high gloss printing to impart high gloss to the printing layer,
   wherein the following relationships are satisfied:
   in the high gloss printing mode, Gp≥Gm and, in the low gloss printing mode, Gm≥Gp, where Gm represents a gloss level of the substrate and Gp represents a gloss level of the printing layer.

10. The printing device according to claim 9, wherein, in the high gloss printing mode, Gp−Gm≥20 and, in the low gloss printing mode, Gm−Gp≥30.

11. The printing device according to claim 9, wherein, in the high gloss printing mode, Sdqm≥Sdqp, and, in the low gloss printing mode, Sdqp≥Sdqm, where Sdqm represents root mean square gradient Sdq of the substrate and Sdqp represents root mean square gradient Sdq of a surface of the printing layer.

12. The printing device according to claim 9, wherein, in the high gloss printing mode, Sdqm−Sdqp≥0.03 and, in the low gloss printing mode, Sdqp−Sdqm≥0.05.

13. The printing device according to claim 9, wherein a proportion of the resin in the clear ink is 8 percent by mass or more.

14. The printing device according to claim 9, wherein the resin comprises a polyurethane resin.

15. The printing device according to claim 9, wherein the clear ink further comprises a surfactant and a proportion of the surfactant in the clear ink is 2.00 percent by mass or less.

16. The printing device according to claim 9, wherein Gm and Gp are 60° gloss values.

17. A printing method comprising:
   discharging a liquid comprising a clear ink comprising water and a resin directly or indirectly onto a substrate to form a printing layer; and
   heating the substrate by a heating device,
   wherein the following relationship is satisfied:
   HTlow (degrees C.)>HThigh (degrees C.), where HTlow (degrees C.) represents a temperature of the heating device during printing in a low gloss printing mode to impart low gloss to the printing layer and HThigh (degrees C.) represents a temperature of the substrate that the heating device is heating during printing in a high gloss printing mode to impart high gloss to the printing layer, wherein the following relationship is satisfied:
in the high gloss printing mode, Gp≥Gm and, in the low gloss printing mode, Gm≥Gp, where Gm represents a gloss level of the substrate and Gp represents a gloss level of the printing layer.

* * * * *